(12) United States Patent
Chang et al.

(10) Patent No.: US 9,024,492 B2
(45) Date of Patent: May 5, 2015

(54) LASER-WELDED JOINT STRUCTURE BETWEEN INSULATION FRAME AND BEARING CUP OF FAN AND METHOD OF FORMING SAME

(71) Applicant: Asia Vital Components Co., Ltd., Sinjhuang District, New Taipei (TW)

(72) Inventors: Bor-Haw Chang, New Taipei (TW); Ping-Tsang Ho, New Taipei (TW); Chin-Sung Pan, New Taipei (TW); Feng Liu, New Taipei (TW)

(73) Assignee: Asia Vital Components Co., Ltd., New Taipei (TW)

( * ) Notice: Subject to any disclaimer, the term of this patent is extended or adjusted under 35 U.S.C. 154(b) by 391 days.

(21) Appl. No.: 13/661,019

(22) Filed: Oct. 25, 2012

(65) Prior Publication Data

US 2014/0117800 A1   May 1, 2014

(51) Int. Cl.
*H02K 15/02* (2006.01)
*H02K 5/16* (2006.01)
*B29C 65/16* (2006.01)
*H02K 5/167* (2006.01)
*H02K 1/18* (2006.01)

(52) U.S. Cl.
CPC .............. *H02K 5/1675* (2013.01); *H02K 1/187* (2013.01)

(58) Field of Classification Search
USPC ................................................ 310/90; 29/596
See application file for complete search history.

(56) References Cited

U.S. PATENT DOCUMENTS

| | | | |
|---|---|---|---|
| 3,728,563 A * | 4/1973 | Stone | 310/90 |
| 4,825,114 A * | 4/1989 | Ohtsuka et al. | 310/90 |
| 5,663,604 A * | 9/1997 | Takahashi | 310/91 |
| 6,654,213 B2 * | 11/2003 | Horng et al. | 361/23 |
| 6,893,230 B2 * | 5/2005 | Sung et al. | 417/354 |
| 7,183,679 B2 * | 2/2007 | Liu | 310/67 R |
| 7,508,102 B2 * | 3/2009 | Sugiyama et al. | 310/67 R |
| 7,701,098 B2 * | 4/2010 | Yang et al. | 310/67 R |
| 2008/0298983 A1 * | 12/2008 | Tsai et al. | 417/354 |
| 2009/0309438 A1 * | 12/2009 | Horng et al. | 310/90 |
| 2010/0127588 A1 * | 5/2010 | Horng | 310/90 |

* cited by examiner

*Primary Examiner* — Burton Mullins (57) ABSTRACT

A laser-welded joint structure between insulation frame and bearing cup of fan includes a base having a bearing cup and a stator having at least one insulation frame. The insulation frame includes a sleeve portion defining a bore axially extending therethrough. The sleeve portion is provided on an inner wall surface with at least one pressing section that radially projects into the bore to press a lower side against an upper end of the bearing cup and a bearing received therein. A portion of at least one lateral side of each pressing section that is in contact with the upper end of the bearing cup is melted by laser beam to form a laser-welded joint, so that the insulation frame and the bearing cup are integrally connected together at reduced manufacturing cost and have increased structural strength. A method of forming the laser-welded joint structure is also disclosed.

10 Claims, 9 Drawing Sheets

LASER-WELDED JOINT STRUCTURE BETWEEN INSULATION FRAME AND BEARING CUP OF FAN AND METHOD OF FORMING SAME

FIELD OF THE INVENTION

The present invention relates to a joint structure between insulation frame and bearing cup of fan, and more particularly, to a laser-welded joint structure between insulation frame and bearing cup of fan that gives the insulation frame and the bearing cup an increased structural strength at reduce manufacturing cost. The present invention also relates to a method of forming such laser-welded joint structure between an insulation frame and a bearing cup of a fan.

BACKGROUND OF THE INVENTION

There are various kinds of devices, including fans, which are driven by a motor to operate. Therefore, the quality of the motor determines the quality of the device using same. Among others, the bearing is an element that has most important influence on the motor operation. The bearing that fails to lubricate and hold the rotary shaft of the motor in place will produce noise during motor operation or even shortens the motor service life in a worse condition.

To enable sufficient lubricating effect, the bearing for fan is usually an oil-impregnated bearing received in a bearing cup made of a metal material, such as copper. The metal bearing cup is processed by turning and has relatively high precision, so that the oil-impregnated bearing can be easily and properly fitted in the metal bearing cup by way of press fit. Meanwhile, it is also easier to control the tightness of a copper ring that is arranged in the bearing cup by tight fit to locate above the oil-impregnated bearing. The copper ring holds down the bearing in the bearing cup and prevents the bearing from moving out of the bearing cup when it rotates along with the fan's rotary shaft, so that the fan can operate stably.

While the metal bearing cup has the advantage of allowing easy control of the accurate fit between it and the copper ring and the oil-impregnated bearing, it has relatively complex structure and involves complicated processing procedures. When the metal bearing cup has to be additionally turned for forming a stepped inner wall surface for supporting the oil-impregnated bearing thereon, or when the metal bearing cup has an inner diameter too much different from the outer diameter of the oil-impregnated bearing, additional turning is required to expand the inner diameter of the metal bearing cup until an allowable tolerance between the bearing cup inner diameter and the bearing outer diameter is reached. In this case, the overall manufacturing cost of the fan is inevitably increased.

The bearing cup in conventional fans can also be integrally formed of a plastic material by injection molding for use with the oil-impregnated bearing. A copper ring is also provided in the plastic bearing cup above the oil-impregnated bearing for holding down the bearing, so that the bearing is prevented from moving out of the bearing cup when it rotates along with the fan's rotary shaft and the fan can operate stably. While the plastic injection molded bearing cup can be manufactured at lower cost compared to the metal bearing cup, it has its own problem. That is, the bearing cup integrally formed by injection molding tends to have an inner diameter with a relatively large size tolerance, which results in difficulty in well control of the tightness of the copper ring in the bearing cup. When the inner diameter of the injection molded bearing cup is too large, the copper ring is loosely fitted in the bearing cup and fails to effectively hold down the oil-impregnated bearing and prevent the same from moving out of the bearing cup. On the other hand, when the inner diameter of the injection molded bearing cup is too small, different structural damages tend to occur, such as a broken bearing cup and a deformed or shrunk oil-impregnated bearing.

Therefore, the conventional fans, either having a metal bearing cup or a plastic injection molded bearing cup, all have a copper ring for holding down the bearing in the bearing cup to ensure stable fan operation. However, with the trend of designing and manufacturing slim-type electronic products, such as notebook computers, miniature cooling fans having reduced overall thickness are also developed to match the slim-type electronic products.

The conventional miniature fans have a metal or a plastic bearing cup that can receive an oil-impregnated bearing therein but not the copper ring. This is because the currently available technique fails to manufacture a copper ring that can match the size of the bearing cup of the miniature fan. Therefore, the existing miniature fans do not have a copper ring mounted in the bearing cup thereof. As a result, when the miniature fans operate, the oil-impregnated bearing thereof tends to slide in the bearing cup to produce noise, shorten the fan service life, and adversely affect the fan rotational efficiency.

It is therefore tried by the inventor to develop a laser-welded joint structure between insulation frame and bearing cup of fan to solve the problems and disadvantages in prior art fan structures.

SUMMARY OF THE INVENTION

A primary object of the present invention is to provide a laser-welded joint structure between insulation frame and bearing cup of fan to reduce the fan manufacturing cost.

Another object of the present invention is to provide a laser-welded joint structure between insulation frame and bearing cup of fan that gives the insulation frame and the bearing cup an increased structural strength.

A further object of the present invention is to provide a fan that employs a laser-welded joint structure between an insulation frame and a bearing cup thereof, so as to hold a bearing in place in the bearing cup and achieve stable fan operation; and the fan can be a general axial flow fan or a miniature centrifugal or axial flow fan.

A still further object of the present invention is to provide a method of forming a laser-welded joint structure between an insulation frame and a bearing cup of a fan to reduce the fan manufacturing cost.

A still further object of the present invention is to provide a method of forming a laser-welded joint structure between an insulation frame and a bearing cup of a fan, so as to give the insulation frame and the bearing cup an increased structural strength.

A still further object of the present invention is to provide a method of forming a laser-welded joint structure between an insulation frame and a bearing cup for general axial flow fan or miniature centrifugal or axial flow fan, so as to hold a bearing in place in the bearing cup and achieve stable fan operation.

To achieve the above and other objects, the laser-welded joint structure between insulation frame and bearing cup of fan according to the present invention includes a base and a stator. The base has a bearing cup forward projected therefrom to internally define a bearing receiving hole for accommodating a bearing therein. The stator includes at least one insulation frame, which has a sleeve portion fitted around the bearing cup and a bore axially extending through the sleeve portion and communicating with the bearing receiving hole. The sleeve portion is provided on an inner wall surface with one or more pressing sections that radially inward project into the bore with a lower side thereof pressing against the bearing and an upper end of the bearing cup. A portion of at least one lateral side of each pressing section that is in contact with the upper end of the bearing cup is melted by laser beam, for example, to form a welded joint, via which the pressing section is connected to the upper end of the bearing cup. With the laser-welded joint structure between insulation frame and bearing cup of fan according to the present invention, it is able to effectively increase the structural strength of the insulation frame and the bearing cup and reduce the fan manufacturing cost.

To achieve the above and other objects, the method of forming laser-welded joint structure between insulation frame and bearing cup of fan according to the present invention includes the steps of (a) providing a base and a stator; the base having a bearing cup internally defining a bearing receiving hole for accommodating a bearing therein; the stator including at least one insulation frame, which has a sleeve portion and a bore axially extending through the sleeve portion and communicating with the bearing receiving hole; and the sleeve portion being provided on an inner wall surface with at least one pressing section that radially inward projects into the bore; (b) fitting the sleeve portion around the bearing cup to press a lower side of each pressing section against the bearing and an upper end of the bearing cup; and (c) projecting a laser beam to melt a portion of one lateral side of each pressing section that is in contact with the upper end of the bearing cup, so as to form a welded joint that integrally connects the insulation frame to the bearing cup. With the method of forming laser-welded joint structure between insulation frame and bearing cup of fan according to the present invention, it is able to effectively increase the structural strength of the insulation frame and the bearing cup and reduce the fan manufacturing cost.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

The present invention will now be described with some preferred embodiments thereof and with reference to the accompanying drawings. For the purpose of easy to understand, elements that are the same in the preferred embodiments are denoted by the same reference numerals.

Figure 1:
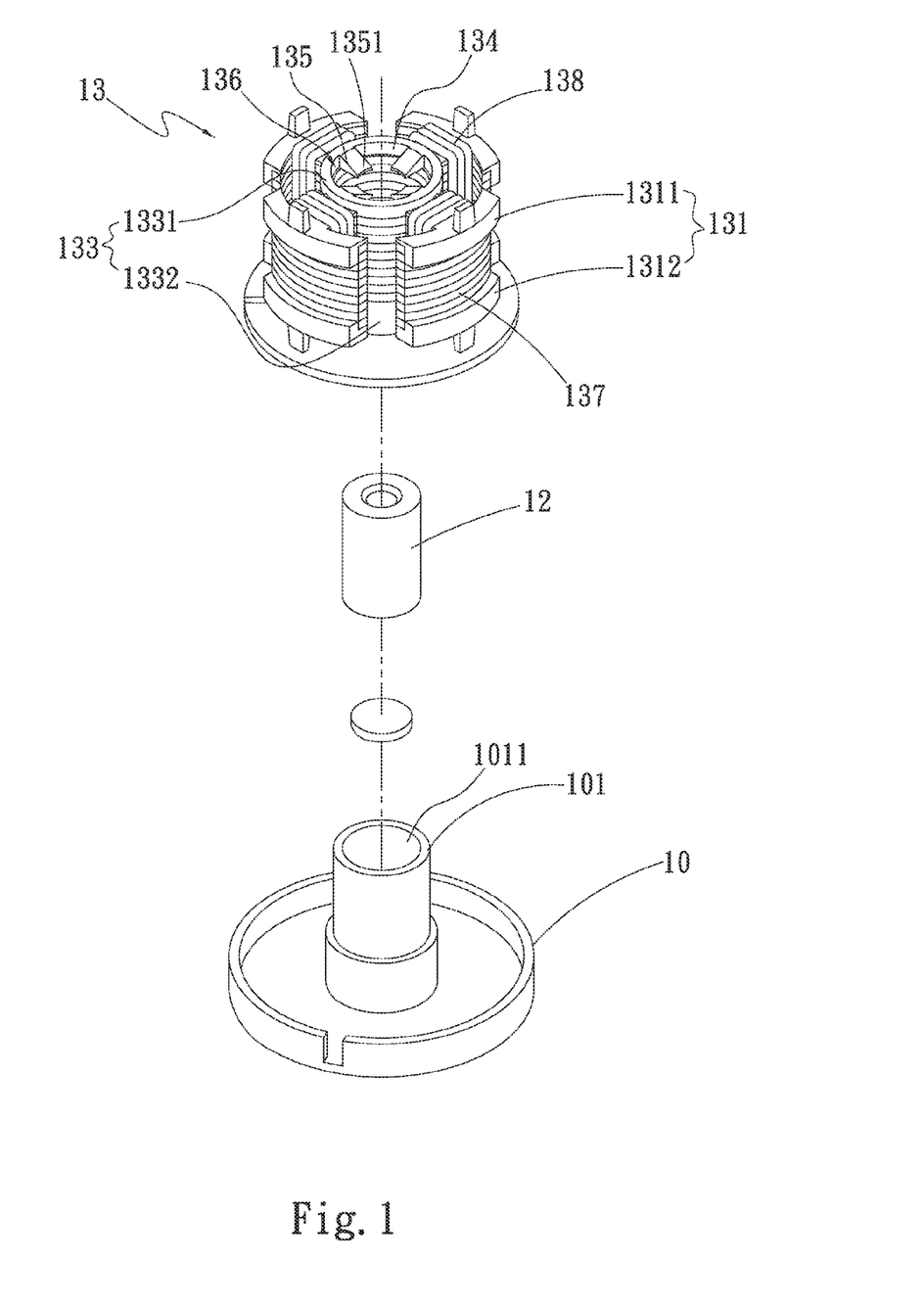
FIG. 1 is an exploded perspective view of a laser-welded joint structure between insulation frame and bearing cup of fan according to a first preferred embodiment of the present invention.
Figure 2A:
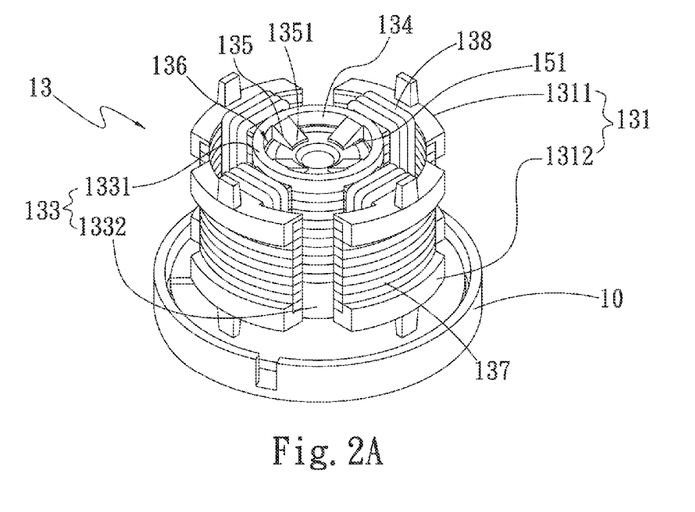
FIG. 2A is an assembled view of FIG. 1.
Figure 2B:
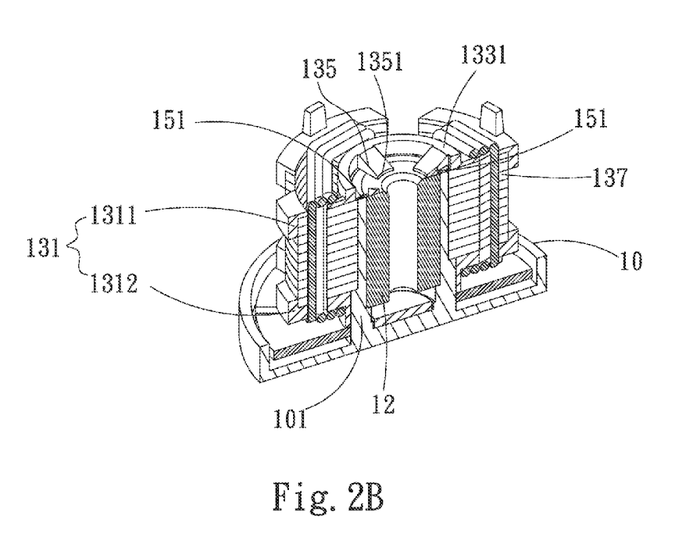
FIG. 2B is a vertical sectional view of FIG. 2A.
Figure 3:
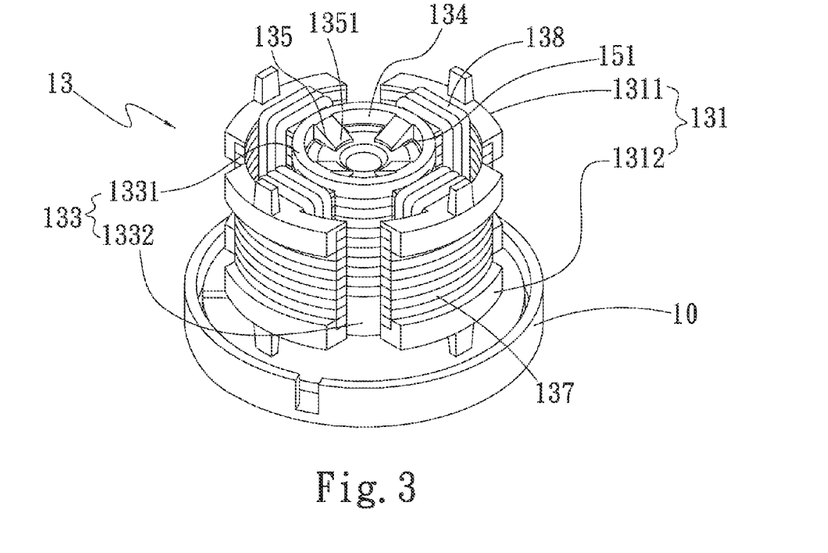
FIG. 3 is another assembled perspective view of the first preferred embodiment of the present invention.

Please refer to FIGS. 1 and 2A that are exploded and assembled perspective views, respectively, of a laser-welded joint structure between insulation frame and bearing cup of fan according to a first preferred embodiment of the present invention; and to FIG. 2B that is a vertical sectional view of FIG. 2A. As shown, the first preferred embodiment of the present invention includes a base 10 and a stator 13. The base 10 has a bearing cup 101 axially forward extended from a center of the base 10. The bearing cup 101 internally defines an axially extended bearing receiving hole 1011 for accommodating a bearing 12 therein. In the illustrated first preferred embodiment, the bearing 12 is shown as an oil-impregnated bearing. However, in practical implementation of the present invention, the bearing 12 is not necessarily limited to the oil-impregnated bearing, but can be a ball bearing, a hydro bearing or other types of bearings.

The stator 13 includes at least one insulation frame 131, a silicon steel plate assembly 137, and a plurality of coils 138. The insulation frame 131 includes an upper insulation frame 1311, a lower insulation frame 1312, a sleeve portion 133, and a bore 134. The upper and the lower insulation frame 1311, 1312 are assembled to an upper and a lower side of the silicon steel plate assembly 137, respectively; and the coils 138 are wound on the upper and the lower insulation frame 1311, 1312. The sleeve portion 133 includes a first sleeve 1331 and a second sleeve 1332, which are centered in the upper and the lower insulation frame 1311, 1312, respectively, to together enclose the bearing cup 101 therein. In brief, the sleeve portion 133 is fitted on around the bearing cup 101.

In the illustrated first preferred embodiment, the insulation frame 131 and the bearing cup 101 are made of the same material. That is, the insulation frame 131 and the bearing cup 101 can be similarly made of a plastic material or a metal material. However, in practical implementation of the present invention, the insulation frame 131 and the bearing cup 101 may be otherwise made of different materials. For example, the insulation frame 131 may be made of a plastic material while the bearing cup 101 is made of a metal material; or alternatively, the insulation frame 131 may be made of a metal material while the bearing cup 101 is made of a plastic material.

The bore 134 axially extends from the first sleeve 1331 to the second sleeve 1332 of the sleeve portion 133, and an open end of the bore 134 at the first sleeve 1331 of the sleeve portion 133 is communicable with the bearing receiving hole 1011 in the bearing cup 101. The upper sleeve 1331 is provided on an inner wall surface with at least one pressing section 135 that radially inward projects into the bore 134. The pressing section 135 has a lower side pressed against an upper end of the bearing cup 101 and the bearing 12 fitted in the bearing cup 101 to provide a holding-down force on the bearing 12 and accordingly, effectively hold the bearing 12 in place in the bearing cup 101. In the illustrated first preferred embodiment, there are shown four pressing sections 135 equally spaced along the inner wall surface of the upper sleeve 1331 to extend into the bore 134.

However, in practical implementation of the present invention, the number of the pressing sections 135 is not necessarily limited to four but can be increased or decreased according to required structural strength and holding-down force in design. Further, the pressing sections 135 can be otherwise non-equally spaced along the inner wall surface of the upper sleeve 1331.

As can be seen in FIGS. 1, 2A and 2B, the pressing sections 135 radially inward extended from the inner wall surface of the upper sleeve 1331 respectively have a free end 1351 extended into a central area of the bore 134 to press against the bearing 12. Further, a separating space 136 is defined between any two adjacent pressing sections 135, and the separating spaces 136 are communicable with the bore 134.

A portion of one lateral side of each pressing section 135 that is in contact with the upper end of the bearing cup 101 is welded to the upper end of the bearing cup 101 by way of laser processing, such as laser welding, to form a welded joint 151 thereat. That is, the welded joint 151 connects one lateral side of the pressing section 135 to the upper end of the bearing cup 101, so that the pressing section 135 on the insulation frame 131 and the upper end of the bearing cup 101 are welded together to form an integral body. In this manner, both the insulation frame 131 and the bearing cup 101 can have effectively enhanced structural strength while the bearing 12 can be stably held in the bearing cup 101.

In practical implementation of the present invention, the portions on both lateral sides of each pressing section 135 that are in contact with the upper end of the bearing cup 101 can be laser-welded to the upper end of the bearing cup 101 at the same time to form two welded joints 151 thereat.

By forming the welded joints 151 at the contact areas between the pressing sections 135 of the insulation frame 131 and the upper end of the bearing cup 101, both of the insulation frame 131 and the bearing cup 101 can have effectively enhanced structural strength, and the stator 13 and the base 10 can be assembled together at reduced manufacturing cost.

Figure 4A:
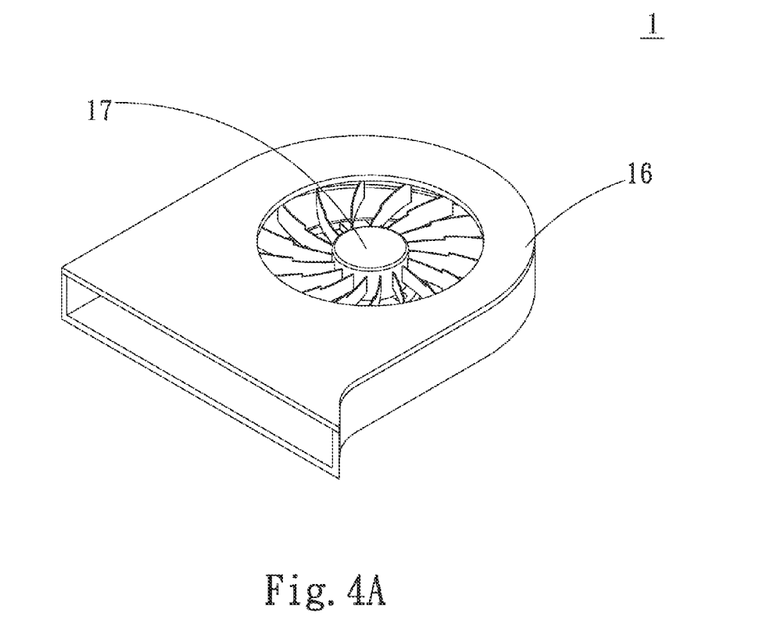
FIG. 4A is an assembled perspective view of a fan according to a second preferred embodiment of the present invention.
Figure 4B:
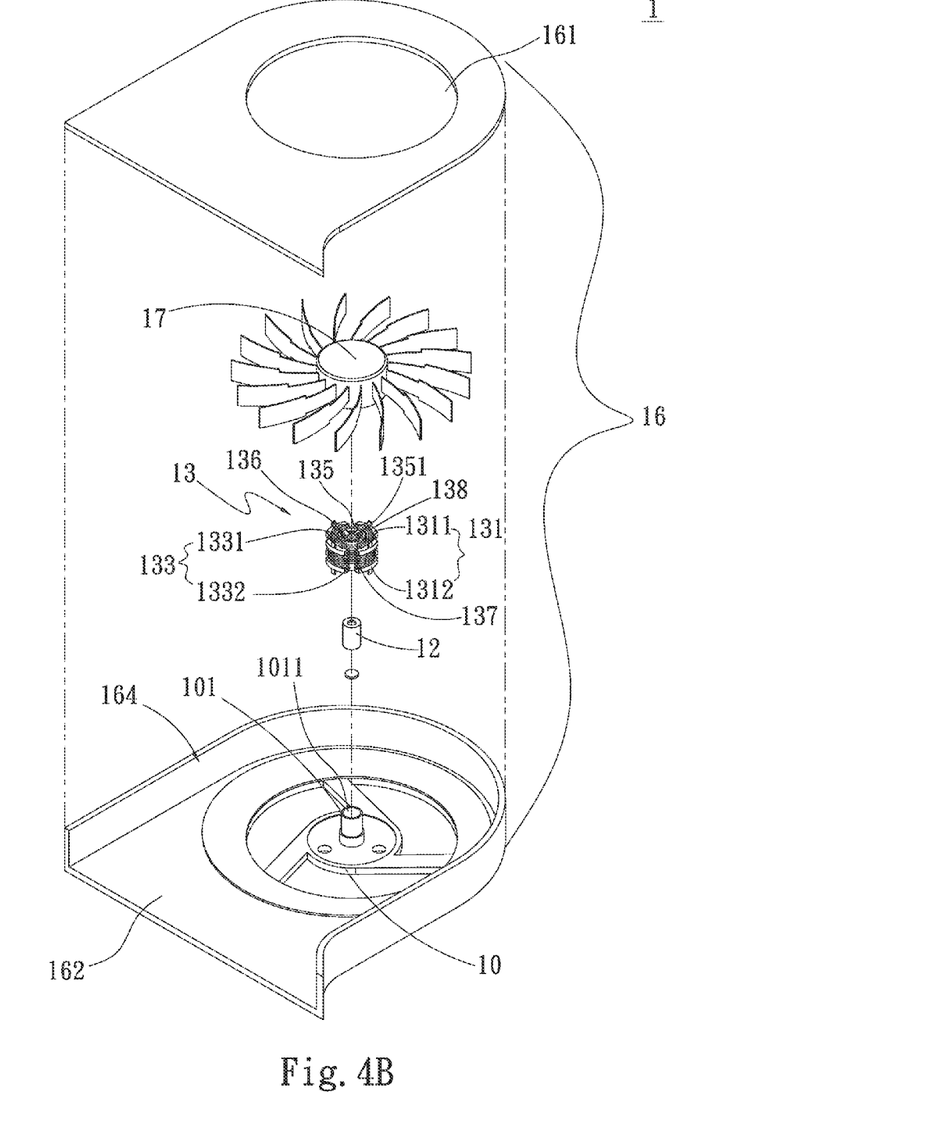
FIG. 4B is an exploded view of FIG. 4A.
Figure 5A:
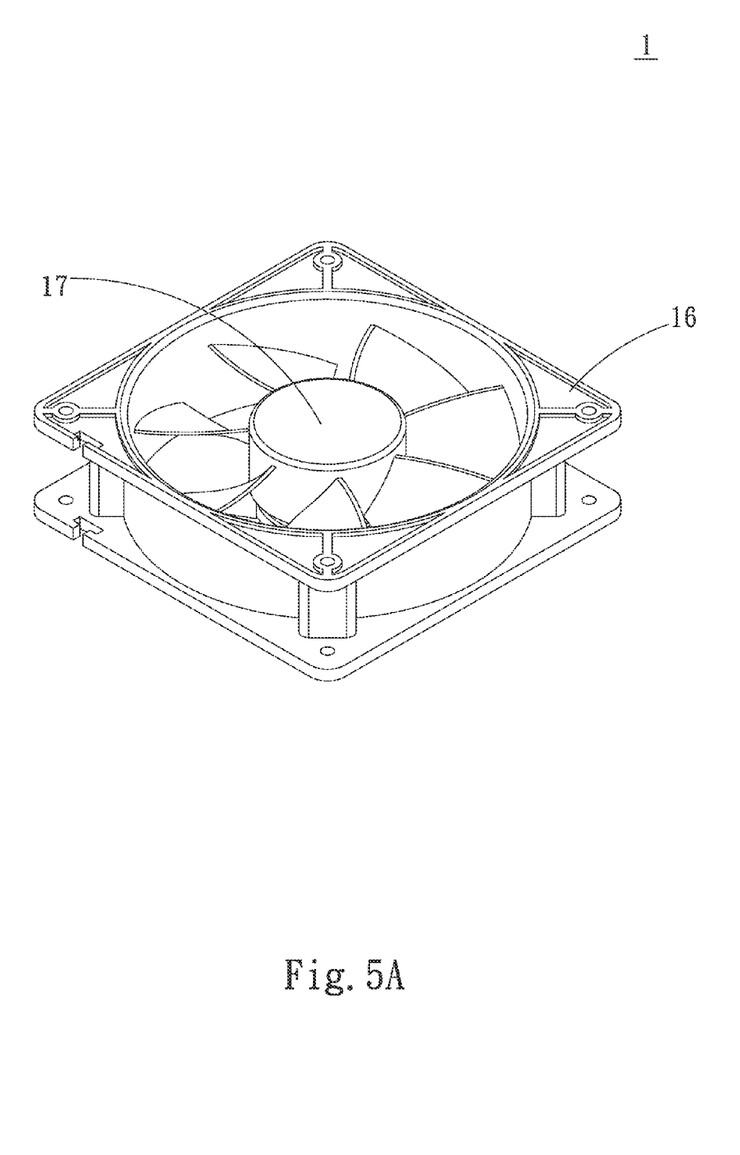
FIG. 5A is an assembled perspective view of another fan according to the second preferred embodiment of the present invention.
Figure 5B:
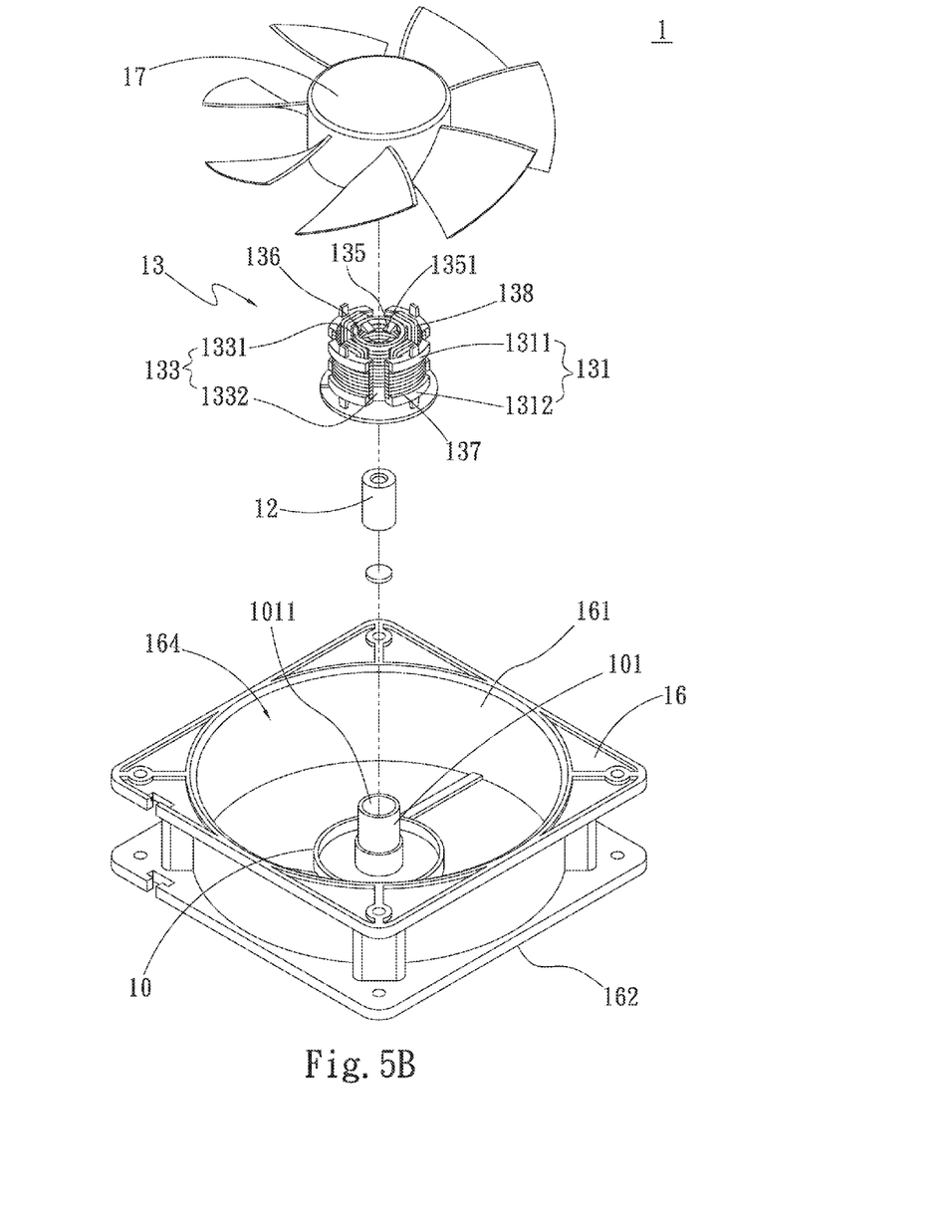
FIG. 5B is an exploded view of FIG. 5A.

FIGS. 4A and 4B are assembled and exploded perspective views, respectively, of a fan 1 according to a second preferred embodiment of the present invention. Please refer to FIGS. 4A and 4B along with FIG. 2A. The fan 1 adopts the laser-welded joint structure between insulation frame and bearing cup according to the first preferred embodiment of the present invention. While the fan 1 in the illustrated second preferred embodiment is a miniature centrifugal fan, it is understood the fan 1 is not necessarily limited thereto but can be, for example, an axial flow fan as that shown in FIGS. 5A and 5B for use with other electronic products, such as a notebook computer, a desktop computer, and other industrial or home electronic devices.

The fan 1 includes a frame 16, a rotor 17, and a stator 13 as that in the first preferred embodiment of the present invention. The frame 16 has an air inlet 161, an air outlet 162 communicable with the air inlet 161, and a receiving space 164 defined in the frame 16 between the air inlet 161 and the air outlet 162. A base 10 is provided in the frame 16 to locate near a central area of the receiving space 164, and the rotor 17 is rotatably connected to a bearing cup 101 forward projected from the base 10. The stator 13 is assembled to the bearing cup 101 in the same manner as that described in the first preferred embodiment of the present invention. When the fan 1 operates, the free ends 1351 of the pressing sections 135 are pressed against a bearing 12 mounted in the bearing cup 101 to hold the bearing 12 in place. Meanwhile, with the welded joints 151 formed between the pressing sections 135 of the insulation frame 131 of the stator 13 and the upper end of the bearing cup 101, the insulation frame 131 and the bearing cup 101 both have largely increased structural strength.

Figure 6:
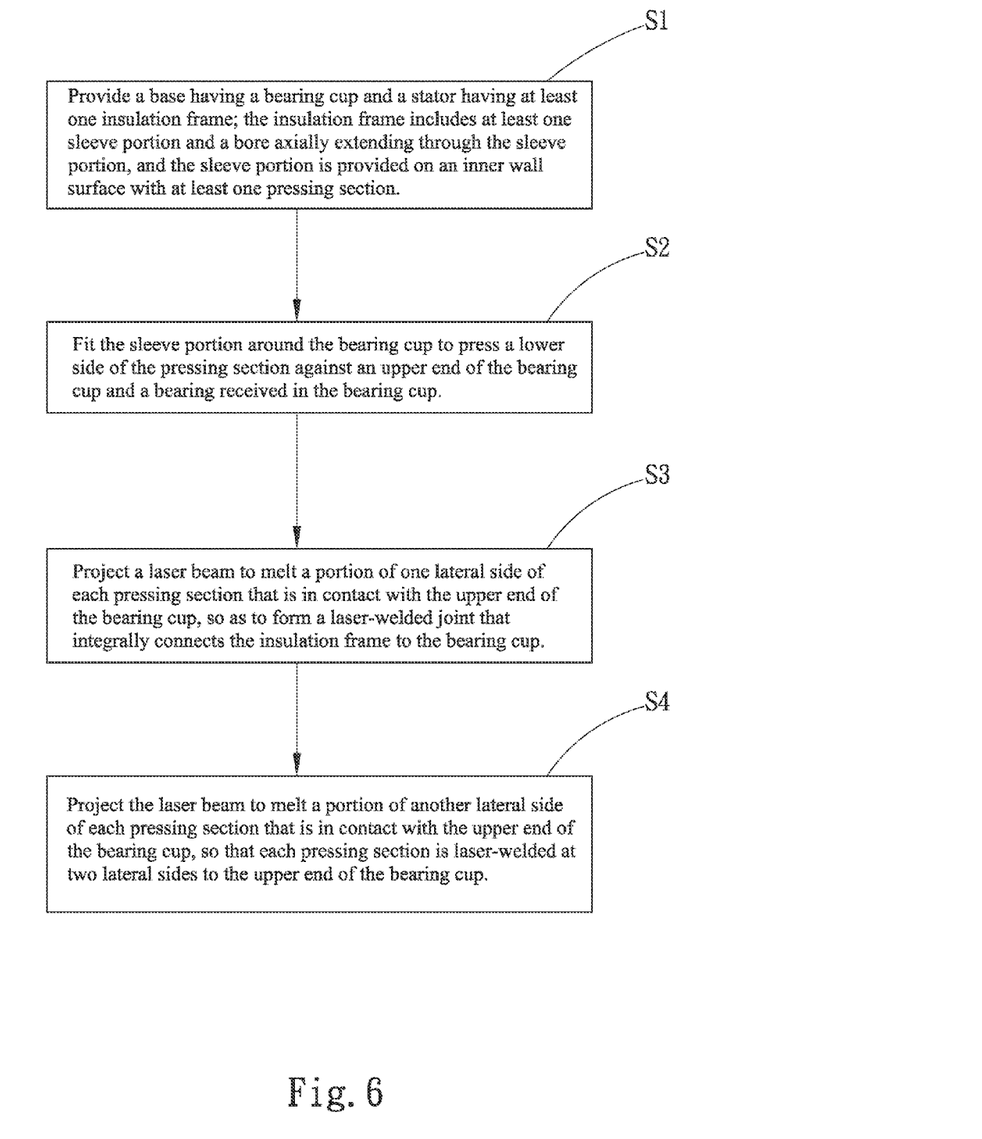
FIG. 6 is a flowchart showing the steps included in a method of forming laser-welded joint structure between insulation frame and bearing cup of fan according to a third preferred embodiment of the present invention.
Figure 7A:
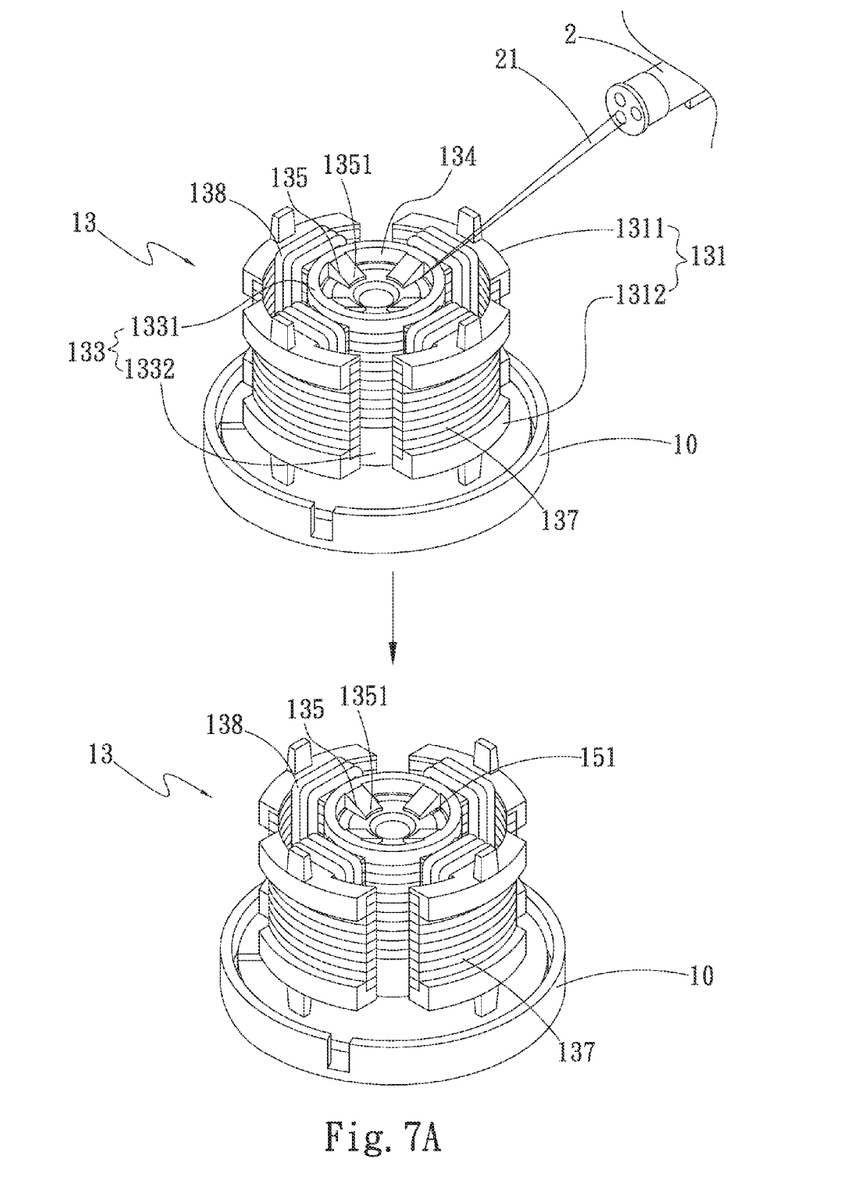
FIGS. 7A and 7B are pictorial illustrations of the steps shown in FIG. 6.
Figure 7B:
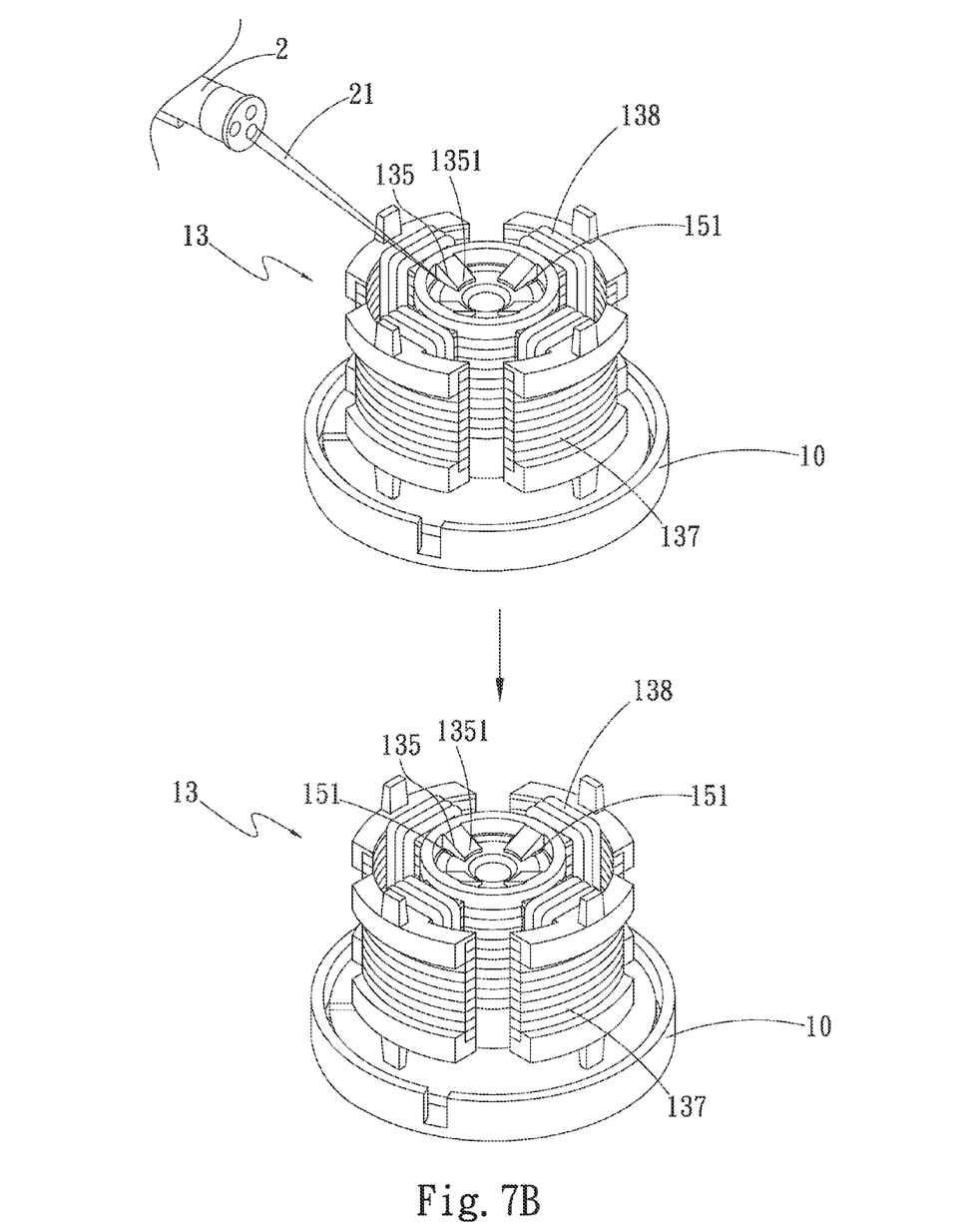

FIG. 6 is a flowchart showing four steps S1 to S4 included in a method according to a third preferred embodiment of the present invention for forming the laser-welded joint structure between insulation frame and bearing cup of fan as described in the first preferred embodiment of the present invention; and FIGS. 7A and 7B are pictorial illustrations of the method according to the third preferred embodiment of the present invention. Please refer to FIGS. 6, 7A and 7B along with FIGS. 1 and 2A.

In the step S1, a base and a stator are provided. The base has a bearing cup, which internally defines a bearing receiving hole for accommodating a bearing therein; and the stator includes at least one insulation frame, which has a sleeve portion and a bore axially extending through the sleeve portion. The bore is communicable with the bearing receiving hole, and the sleeve portion is provided on an inner wall surface with at least one pressing section that radially inward projects into the bore.

More specifically, a base 10 and a stator 13 are provided. The base 10 has a bearing cup 101 that is forward extended from the base 10 and internally defines a bearing receiving hole 1011 for accommodating a bearing 12 therein. The stator 13 includes at least one insulation frame 131, which has a sleeve portion 133 and a bore 134 axially extending through the sleeve portion 133 (i.e. the above-mentioned first and the second sleeve 1331, 1332). The bore 134 is communicable with the bearing receiving hole 1011, and the first sleeve 1331 is provided on an inner wall surface with one or more pressing sections 135 that radially inward project into and are circumferentially equally or non-equally spaced in the bore 134. Wherein, the insulation frame 131 and the bearing cup 101 can be made of different materials or the same material.

In the step S2, fit the sleeve portion around the bearing cup to press a lower side of the pressing sections against the bearing and an upper end of the bearing cup.

More specifically, the sleeve portion 133 is fitted around the bearing cup 101 with a lower side of the pressing sections 135 pressed against the bearing 12 and an upper end of the bearing cup 101, as shown in FIG. 2A, so as to provide a holding-down force on the bearing 12 and accordingly, effectively hold the bearing 12 in place in the bearing cup 101.

In the step S3, project a laser beam to melt a portion of one lateral side of each pressing section that is in contact with the upper end of the bearing cup, so as to form a welded joint that integrally connects the insulation frame to the bearing cup.

More specifically, as shown in FIG. 7A, use a laser device 2 to project a laser beam 21 on a portion of one lateral side of each pressing section 135 that is in contact with the upper end of the bearing cup 101, so that the laser irradiated portions are molten and then set to form a plurality of welded joints 151, via which the insulation frame 131 is connected to the bearing cup 101 to form an integral body.

In the step S4, project a laser beam to melt a portion of another lateral side of each pressing section that is in contact with the upper end of the bearing cup, so that the pressing sections are laser-welded at two lateral sides to the upper end of the bearing cup.

More specifically, as shown in FIG. 7B, use the laser device 2 to project the laser beam 21 on a portion of another lateral side of each pressing section 135 that is in contact with the upper end of the bearing cup 101, so that the laser irradiated portions are molten and then set to further form a plurality of welded joints 151. The welded joints 151 between two lateral sides of the pressing sections 135 and the upper end of the bearing cup 101 largely increase the structural strength of the insulation frame 131 and the bearing cup 101.

With the method according to the third preferred embodiment of the present invention, the insulation frame of the stator and the bearing cup of a fan can be joined to obtain increased structural strength at effectively reduced cost; and the insulation frame and the bearing cup connected via the laser-welded joint structure can be more advantageously applied to general fans, such as axial flow fans, or to miniature fans, including centrifugal fans and axial flow fans, for use in different electronic products.

In conclusion, the present invention has the following advantages: (1) saving fan manufacturing cost; (2) utilizing the welded joints between the lateral sides of the pressing sections of the insulation frame and the upper end of the bearing cup to integrally connect the insulation frame to the bearing cup, effectively hold the bearing in place, and give the insulation frame and the bearing cup an increased structural strength; and (3) being applicable to general axial flow fans or miniature fans used with various electronic products, such as desktop and notebook computers.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A laser-welded joint structure between insulation frame and bearing cup of fan, comprising:
    a base having a bearing cup forward projected from the base to internally define a bearing receiving hole for accommodating a bearing therein; and
    a stator including at least one insulation frame, which has a sleeve portion fitted around the bearing cup and a bore axially extending through the sleeve portion and communicating with the bearing receiving hole; the sleeve portion being provided on an inner wall surface with at least one pressing section that radially inward projects into the bore with a lower side thereof pressing against the bearing and an upper end of the bearing cup; a portion of one lateral side of each pressing section that is in contact with the upper end of the bearing cup being melted to form a welded joint, via which the pressing section is connected to the upper end of the bearing cup.

2. The laser-welded joint structure between insulation frame and bearing cup of fan as claimed in claim 1, wherein the pressing section has a free end, which is extended into a central area of the bore to press against the bearing.

3. The laser-welded joint structure between insulation frame and bearing cup of fan as claimed in claim 2, wherein a separating space communicating with the bore is defined between any two adjacent pressing sections; and wherein a portion of another lateral side of each pressing section that is in contact with the upper end of the bearing cup is also melted to form a welded joint.

4. The laser-welded joint structure between insulation frame and bearing cup of fan as claimed in claim 3, wherein the stator further includes a silicon steel plate assembly and a plurality of coils; the insulation frame of the stator including an upper insulation frame and a lower insulation frame assembled to an upper and a lower side of the silicon steel plate assembly, respectively; the coils being wound on the upper and the lower insulation frame; and the sleeve portion of the insulation frame including a first sleeve and a second sleeve centered in the upper and the lower insulation frame, respectively.

5. The laser-welded joint structure between insulation frame and bearing cup of fan as claimed in claim 1, wherein the welded joints are formed between one lateral side of the pressing sections and the upper end of the bearing cup by means of laser welding.

6. The laser-welded joint structure between insulation frame and bearing cup of fan as claimed in claim 3, wherein the welded joints are formed between two lateral sides of the pressing sections and the upper end of the bearing cup by means of laser welding.

7. The laser-welded joint structure between insulation frame and bearing cup of fan as claimed in claim 1, wherein the insulation frame and the bearing cup can be made of different materials or the same material.

8. A method of forming laser-welded joint structure between insulation frame and bearing cup of fan, comprising the steps of:
    a) providing a base and a stator; the base having a bearing cup forward extended therefrom to internally define a bearing receiving hole for accommodating a bearing therein; the stator including at least one insulation frame, which has a sleeve portion and a bore axially extending through the sleeve portion and communicating with the bearing receiving hole; and the sleeve portion being provided on an inner wall surface with at least one pressing section that radially inward projects into the bore;
    b) fitting the sleeve portion around the bearing cup to press a lower side of each pressing section against the bearing and an upper end of the bearing cup; and
    c) projecting a laser beam to melt a portion of one lateral side of each pressing section that is in contact with the upper end of the bearing cup, so as to form a laser-welded joint that integrally connects the insulation frame to the bearing cup.

9. The method of forming laser-welded joint structure between insulation frame and bearing cup of fan as claimed in claim 8, further comprising a step after the step c to project the laser beam to melt a portion of another lateral side of each pressing section that is in contact with the upper end of the bearing cup, so that each pressing section is laser-welded at two lateral sides to the upper end of the bearing cup.

10. The method of forming laser-welded joint structure between insulation frame and bearing cup of fan as claimed in claim 8, wherein the insulation frame and the bearing cup can be made of different materials or the same material.

* * * * *